US011338859B2

(12) United States Patent
Wires

(10) Patent No.: US 11,338,859 B2
(45) Date of Patent: May 24, 2022

(54) LAND VEHICLES INCORPORATING REMOVABLE POWERTRAIN UNITS, POWERTRAIN UNITS, AND METHODS THEREFOR

(71) Applicant: Workhorse Group Inc., Loveland, OH (US)

(72) Inventor: Donald L. Wires, Loveland, OH (US)

(73) Assignee: Workhorse Group Inc., Loveland, OH (US)

( * ) Notice: Subject to any disclaimer, the term of this patent is extended or adjusted under 35 U.S.C. 154(b) by 0 days.

(21) Appl. No.: 17/142,814

(22) Filed: Jan. 6, 2021

(65) Prior Publication Data
US 2021/0206251 A1 Jul. 8, 2021

Related U.S. Application Data

(60) Provisional application No. 62/957,577, filed on Jan. 6, 2020.

(51) Int. Cl.
*B62D 23/00* (2006.01)
*B29C 70/28* (2006.01)
(Continued)

(52) U.S. Cl.
CPC .............. *B62D 23/00* (2013.01); *B29C 69/02* (2013.01); *B29C 70/28* (2013.01); *B60K 1/02* (2013.01);
(Continued)

(58) Field of Classification Search
CPC .......... B60K 7/0007; B60K 2007/0046; B60K 2007/0092; B62D 25/20; B62D 23/00; B62D 29/04; B62D 65/10
See application file for complete search history.

(56) References Cited

U.S. PATENT DOCUMENTS 1,251,749 A * 1/1918 Cilley .................. B60K 17/046
                                             180/65.6
1,728,889 A * 9/1929 Kemble .................... B60G 5/03
                                             180/24.07
(Continued)

FOREIGN PATENT DOCUMENTS

CN         103359174 A     10/2013
EP          1538072 A1     6/2005
(Continued)

OTHER PUBLICATIONS

International Search Report; International Searching Authority; International Patent Application No. PCT/US2021/012327; dated Mar. 9, 2021; 2 pages.

(Continued)

*Primary Examiner* — Frank B Vanaman
(74) *Attorney, Agent, or Firm* — Taft Stettinius & Hollister LLP

(57) ABSTRACT

Land vehicles, powertrain units for land vehicles, and methods of using land vehicles are disclosed. In certain embodiments, the land vehicles are provided as delivery vehicles and/or utility vehicles. A land vehicle includes a frame structure having a front cage that defines an operator cabin and a rear floor positioned rearward of the front cage. The frame structure supports a plurality of wheels to permit movement of the vehicle relative to an underlying surface in use of the land vehicle. An underside of the frame structure is disposed in confronting relation with the underlying surface.

20 Claims, 10 Drawing Sheets

(51) Int. Cl.
*B29C 69/02* (2006.01)
*B62D 29/04* (2006.01)
*B60K 1/02* (2006.01)
*B62D 25/20* (2006.01)
*B62D 29/02* (2006.01)
*B62D 33/06* (2006.01)
*B62D 65/10* (2006.01)
*B29L 31/30* (2006.01)
*B29K 311/14* (2006.01)
*B29K 309/08* (2006.01)

(52) U.S. Cl.
CPC ........... *B62D 23/005* (2013.01); *B62D 25/20* (2013.01); *B62D 29/02* (2013.01); *B62D 29/043* (2013.01); *B62D 29/046* (2013.01); *B62D 33/06* (2013.01); *B62D 65/10* (2013.01); *B29K 2309/08* (2013.01); *B29K 2311/14* (2013.01); *B29L 2031/30* (2013.01); *B29L 2031/3055* (2013.01)

(56) References Cited

U.S. PATENT DOCUMENTS

| | | | | |
|---|---|---|---|---|
| 4,270,622 | A * | 6/1981 | Travis | B60L 3/0061 180/65.31 |
| 4,934,733 | A * | 6/1990 | Smith | B60G 3/207 280/124.132 |
| 5,363,939 | A | 11/1994 | Catlin | |
| 5,829,542 | A * | 11/1998 | Lutz | B60K 7/0007 180/65.6 |
| 6,893,046 | B2 | 5/2005 | Ledesma | B62D 21/11 180/311 |
| 6,926,351 | B2 | 8/2005 | Telehowski et al. | |
| 7,651,153 | B2 * | 1/2010 | Martin | B60G 21/051 296/155 |
| 8,641,133 | B1 | 2/2014 | Scaringe et al. | |
| 2006/0158024 | A1 * | 7/2006 | Wendi | B60K 17/046 301/137 |
| 2008/0003321 | A1 | 1/2008 | Kerr et al. | |
| 2010/0025132 | A1 * | 2/2010 | Hill | H01M 10/613 180/65.29 |
| 2010/0108417 | A1 * | 5/2010 | Gilmore | B60K 7/0007 180/65.51 |
| 2010/0263954 | A1 | 10/2010 | Constans | |
| 2011/0017527 | A1 | 1/2011 | Oriet et al. | |
| 2013/0341971 | A1 | 12/2013 | Masini et al. | |
| 2014/0182954 | A1 * | 7/2014 | Weber | B60L 50/51 180/65.7 |
| 2015/0027795 | A1 * | 1/2015 | Hirai | B60K 1/04 180/60 |
| 2017/0050514 | A1 * | 2/2017 | Li | B60K 1/02 |
| 2018/0037151 | A1 | 2/2018 | Bauer et al. | |
| 2018/0345777 | A1 | 12/2018 | Bimschein et al. | |
| 2019/0366834 | A1 * | 12/2019 | Nagpal | B60K 7/0007 |
| 2020/0369334 | A1 * | 11/2020 | Lee | B60L 8/003 |

FOREIGN PATENT DOCUMENTS

| | | |
|---|---|---|
| EP | 2552763 A2 | 2/2013 |
| EP | 3689717 A1 | 8/2020 |

OTHER PUBLICATIONS

Written Opinion of the International Searching Authority; International Searching Authority; International Patent Application No. PCT/US2021/012327; dated Mar. 9, 2021; 8 pages.

International Search Report; International Searching Authority; International Patent Application No. PCT/US2021/012330; dated Mar. 9, 2021; 2 pages.

Written Opinion of the International Searching Authority; International Searching Authority; International Patent Application No. PCT/US2021/012330; dated Mar. 9, 2021; 9 pages.

International Search Report; International Searching Authority; International Patent Application No. PCT/US2021/012332; date Mar. 24, 2021; 2 pages.

Written Opinion of the International Searching Authority; International Searching Authority; International Patent Application No. PCT/US2021/012332; dated Mar. 24, 2021; 7 pages.

\* cited by examiner

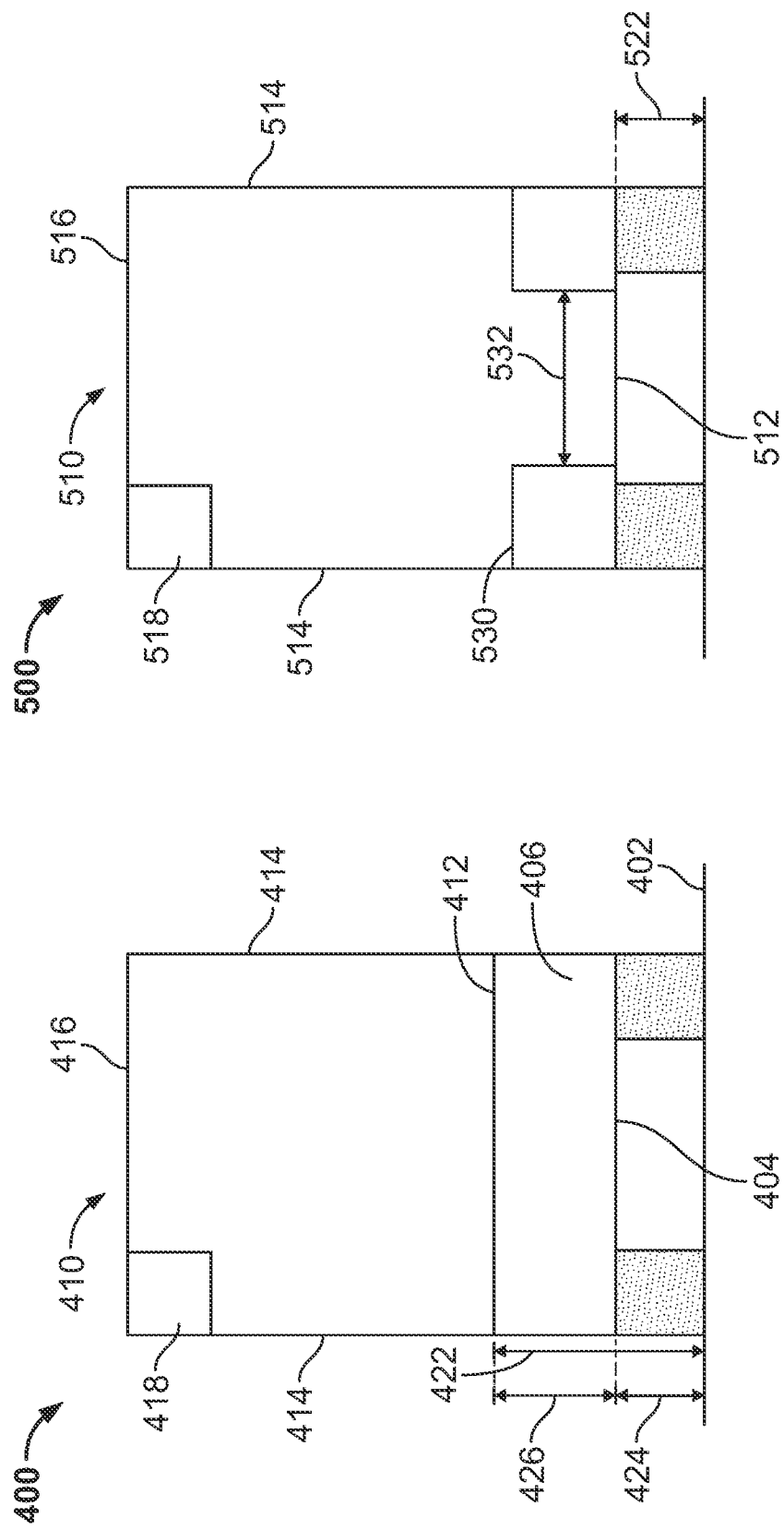

| US Truck Class | Duty Classification | Weight Limit |
|---|---|---|
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds + |

*Prior Art*

FIG. 6

LAND VEHICLES INCORPORATING REMOVABLE POWERTRAIN UNITS, POWERTRAIN UNITS, AND METHODS THEREFOR

CROSS-REFERENCE TO RELATED APPLICATION(S)

The present application claims priority to, and the benefit of, U.S. Provisional App. Ser. No. 62/957,577 entitled "SYSTEMS AND METHODS FOR MANUFACTURING LAND VEHICLES," which was filed on Jan. 6, 2020. The contents of that application are incorporated by reference herein in their entirety.

TECHNICAL FIELD

The present disclosure generally relates to land vehicles incorporating powertrain units, and, more particularly, to utility and deliver vehicles incorporating powertrain units.

BACKGROUND

Current powertrain devices and/or systems for land vehicles, as well as methods associated therewith, suffer from a variety of drawbacks and limitations. For those reasons, among others, there remains a need for further improvements in this technological field.

SUMMARY

The present disclosure may comprise one or more of the following features and combinations thereof.

According to one aspect of the present disclosure, a land vehicle may include a frame structure and at least one powertrain unit. The frame structure may include a front cage that defines an operator cabin and a rear floor positioned rearward of the front cage. The frame structure may support a plurality of wheels to permit movement of the vehicle relative to an underlying surface in use of the land vehicle. An underside of the frame structure may be disposed in confronting relation with the underlying surface. The at least one powertrain unit may be removably attached to the underside of the frame structure. The at least one powertrain unit may include a plurality of drive units coupled to the plurality of wheels. In use of the land vehicle, rotational power may be provided to one of the plurality of wheels by a first drive unit of the plurality of drive units and to another one of the plurality of wheels by a second drive unit of the plurality of drive units.

In some embodiments, the frame structure may be a monocoque having a single-piece, monolithic structure unsupported by an internal chassis, the monocoque may include a core and a shell that at least partially surrounds the core, the core may include balsa wood and one or more composite, non-metallic materials, and the shell may include resin and fiberglass. The vehicle may have a weight limit of between 6,000 pounds and 19,800 pounds. A height of the rear floor above the underlying surface may be between 18 inches and 35 inches.

In some embodiments, a cradle of the at least one powertrain unit may be removably affixed directly to the underside of the frame structure, the first drive unit may be coupled to a first axle of the at least one powertrain unit to drive rotation of the first axle, the second drive unit may be coupled to a second axle of the at least one powertrain unit to drive rotation of the second axle, and the first drive unit, the first axle, the second drive unit, and the second axle may be supported by the cradle such that the first drive unit, the first axle, the second drive unit, and the second axle are aligned along a lateral axis. The first axle may be coupled to a first wheel hub to which a first wheel of the plurality of wheels is mounted for rotation about the lateral axis, the second axle may be coupled to a second wheel hub to which a second wheel of the plurality of wheels is mounted for rotation about the lateral axis, and in use of the land vehicle, rotation of the first wheel about the lateral axis may be driven by the first drive unit independently of rotation of the second wheel about the lateral axis driven by the second drive unit. Additionally, in some embodiments, each of the first drive unit and the second drive unit may be an electric motor. In some embodiments yet still, the first drive unit, the first axle, the second drive unit, and the second axle may be mounted to the cradle such that the first drive unit, the first axle, the second drive unit, and the second axle are detached from the frame structure upon removal of the cradle from the underside of the frame structure.

In some embodiments, the first drive unit may be at least partially aligned with a longitudinal centerline of the underside of the frame structure, the second drive unit may be at least partially aligned with the longitudinal centerline, and each of the first drive unit and the second drive unit may extend outwardly away from, and be located at least partially beneath, the longitudinal centerline. The vehicle may not include a drive shaft arranged along the longitudinal centerline that provides a rotational input to the at least one powertrain unit. The vehicle may not include an internal combustion engine.

According to another aspect of the present disclosure, a powertrain unit for a land vehicle that includes a frame structure supporting a plurality of wheels to permit movement of the vehicle relative to an underlying surface in use of the land vehicle may include a cradle, a first drive unit, and a second drive unit. The cradle may be removably attachable directly to an underside of the frame structure to dispose the cradle in confronting relation with the underlying surface in use of the powertrain unit. The first drive unit may be mounted to the cradle to provide rotational power to a first wheel of the plurality of wheels in use of powertrain unit. The second drive unit may be mounted to the cradle to provide rotational power to a second wheel of the plurality of wheels in use of the powertrain unit.

In some embodiments, the powertrain unit may include a first axle coupled to the first drive unit to be rotatably driven by the first drive unit, a first wheel hub coupled to the first axle and configured to support the first wheel for rotation about a rotational axis, a second axle coupled to the second drive unit to be rotatably driven by the second drive unit, and a second wheel hub coupled to the second axle and configured to support the second wheel for rotation about the rotational axis, and the first drive unit, the first axle, the first wheel hub, the second drive unit, the second axle, and the second wheel hub may be aligned along the rotational axis. The first drive unit, the first axle, the first wheel hub, the second drive unit, the second axle, and the second wheel hub may be mounted to the cradle such that the first drive unit, the first axle, the first wheel hub, the second drive unit, the second axle, and the second wheel hub are detached from the frame structure upon removal of the cradle from the underside of the frame structure.

In some embodiments, each of the first drive unit and the second drive unit may be an electric motor. Additionally, in some embodiments, the powertrain unit may not include an internal combustion engine.

According to yet another aspect of the present disclosure, a method of using a land vehicle that includes a frame structure supporting a plurality of wheels to permit movement of the vehicle relative to an underlying surface in use of the land vehicle and a powertrain unit coupled to the frame structure may include assembling the powertrain unit, attaching a cradle of the assembled powertrain unit directly to an underside of the frame structure such that the powertrain unit is disposed in confronting relation with the underlying surface, and operating the land vehicle.

In some embodiments, assembling the powertrain unit may include mounting a first drive unit of the powertrain unit to the cradle, mounting a second drive unit of the powertrain unit to the cradle, coupling a first axle of the powertrain unit to the first drive unit, coupling a second axle of the powertrain unit to the second drive unit, coupling a first wheel hub of the powertrain unit to the first axle, and coupling a second wheel hub of the powertrain unit to the second axle. Operating the land vehicle may include driving rotation of a first wheel coupled to the first wheel hub by the first drive unit and driving rotation of a second wheel coupled to the second wheel hub by the second drive unit independently of driving rotation of the first wheel by the first drive unit. The method may include removing the powertrain unit from the land vehicle, and removing the powertrain unit from the land vehicle may include detaching the cradle from the underside of the frame structure.

According to yet another aspect of the present disclosure still, a land vehicle may include a frame structure and at least one powertrain unit. The frame structure may include a front cage that defines an operator cabin and a rear floor positioned rearward of the front cage. The frame structure may support a plurality of wheels to permit movement of the vehicle relative to an underlying surface in use of the land vehicle. An underside of the frame structure may be disposed in confronting relation with the underlying surface. The frame structure may be a monocoque having a single-piece, monolithic structure unsupported by an internal chassis. The at least one powertrain unit may be removably attached to the underside of the frame structure. The at least one powertrain unit may include a cradle, a first drive unit, and a second drive unit. The cradle may be directly affixed to the underside of the frame structure and disposed in confronting relation with the underlying surface. The first drive unit may be mounted to the cradle to provide rotational power to a first wheel of the plurality of wheels in use of powertrain unit. The second drive unit may be mounted to the cradle to provide rotational power to a second wheel of the plurality of wheels in use of the powertrain unit.

In some embodiments, the monocoque may include a core and a shell that at least partially surrounds the core, the core may include balsa wood and one or more composite, non-metallic materials, and the shell may include resin and fiberglass. The vehicle may have a weight limit of between 6,000 pounds and 19,800 pounds, a height of the rear floor above the underlying surface may be between 18 inches and 35 inches, and the one or more composite, non-metallic materials may include fiberglass, Kevlar, carbon fiber, or plastic. The at least one powertrain unit may include a first axle coupled to the first drive unit to be rotatably driven by the first drive unit, a first wheel hub coupled to the first axle and configured to support the first wheel for rotation about a rotational axis, a second axle coupled to the second drive unit to be rotatably driven by the second drive unit, and a second wheel hub coupled to the second axle and configured to support the second wheel for rotation about the rotational axis. The first drive unit, the first axle, the first wheel hub, the second drive unit, the second axle, and the second wheel hub may be aligned along the rotational axis, and the first drive unit, the first axle, the first wheel hub, the second drive unit, the second axle, and the second wheel hub may be mounted to the cradle such that the first drive unit, the first axle, the first wheel hub, the second drive unit, the second axle, and the second wheel hub are detached from the frame structure upon removal of the cradle from the underside of the frame structure.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a partial schematic rear end view of a conventional delivery vehicle;

FIG. 5 is a partial schematic rear end view of a delivery vehicle according to at least one embodiment of the disclosure;

FIG. 6 is a table illustrating United States standard vehicle classes by gross vehicular weight rating (GVWR);

DETAILED DESCRIPTION OF ILLUSTRATIVE EMBODIMENTS

Figure 1:
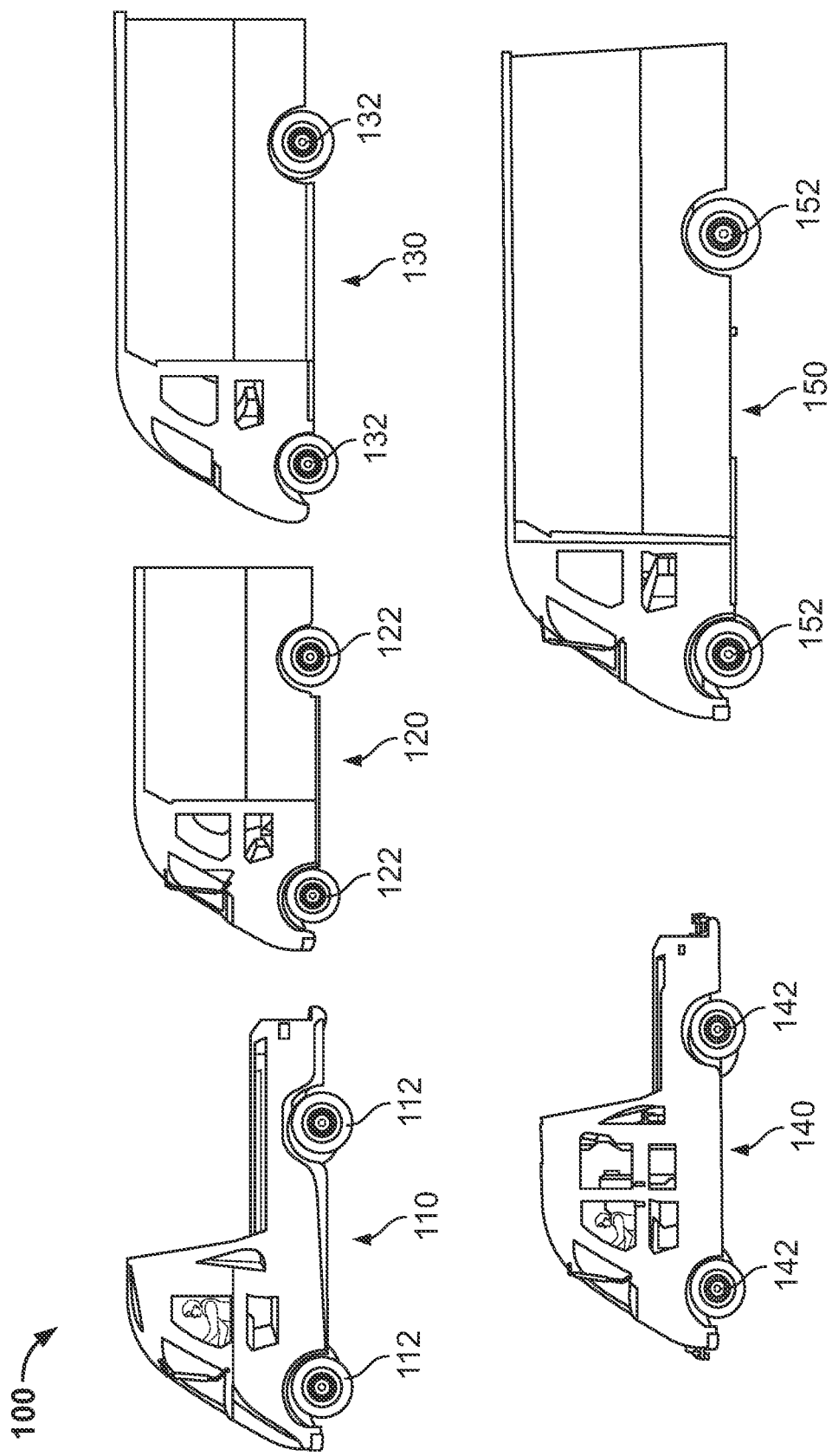
FIG. 1 depicts side elevation views of a number of electric vehicles that may be included in an electric vehicle line according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110, a 650 cubic foot capacity delivery vehicle 120, a 1000 cubic foot capacity delivery vehicle 130, a six-passenger flatbed utility vehicle 140, and a 1200 cubic foot capacity delivery vehicle 150. However, in some embodiments, the land vehicle line 100 may include any vehicle having a capacity within a particular range, such as a range of from 400 cubic feet to 1400 cubic feet, for example. In keeping with industry terminology, the phrase "cubic foot capacity" may be shortened or abbreviated herein to simply "cube." It should be appreciated that the phrase "cubic foot capacity" as contemplated herein may refer to a storage volume or storage capacity of a particular land vehicle. In any case, as will be apparent from the discussion that follows, one or more vehicles of the vehicle line 100 may be manufactured using the systems and methods described herein.

In the illustrative embodiment, each of the vehicles included in the vehicle line 100 (i.e., each of the vehicles 110, 120, 130, 140, 150) includes a monocoque, unibody, or frame structure 200 (see FIG. 2) supporting wheels (e.g., wheels 112, 122, 132, 142, 152) to permit movement of the particular vehicle relative to an underlying surface in use thereof. As described herein, the monocoque 200 is a single-piece, monolithic structure unsupported by an internal chassis. The monocoque 200 includes a front cage 210 defining an operator cabin 212 and a rear floor 220 positioned rearward of the front cage 210. The monocoque 200 illustratively has a composite construction (e.g., the composite structure 700 shown in FIG. 7) such that each of the front cage 210 and the rear floor 220 are formed from one or more composite materials, as described in greater detail below. An underside 214 of the illustrative monocoque 200 faces, and is disposed in confronting relation with, the underlying surface. Further details of the monocoque 200, as well as modular mold systems used to form the monocoque 200, are described in U.S. patent application Ser. No. 17/142,766. Additionally, methods of forming the monocoque 200 are described in U.S. patent application Ser. No. 17/142,785. The disclosures of those applications are incorporated by reference herein in their entireties.

Figure 8:
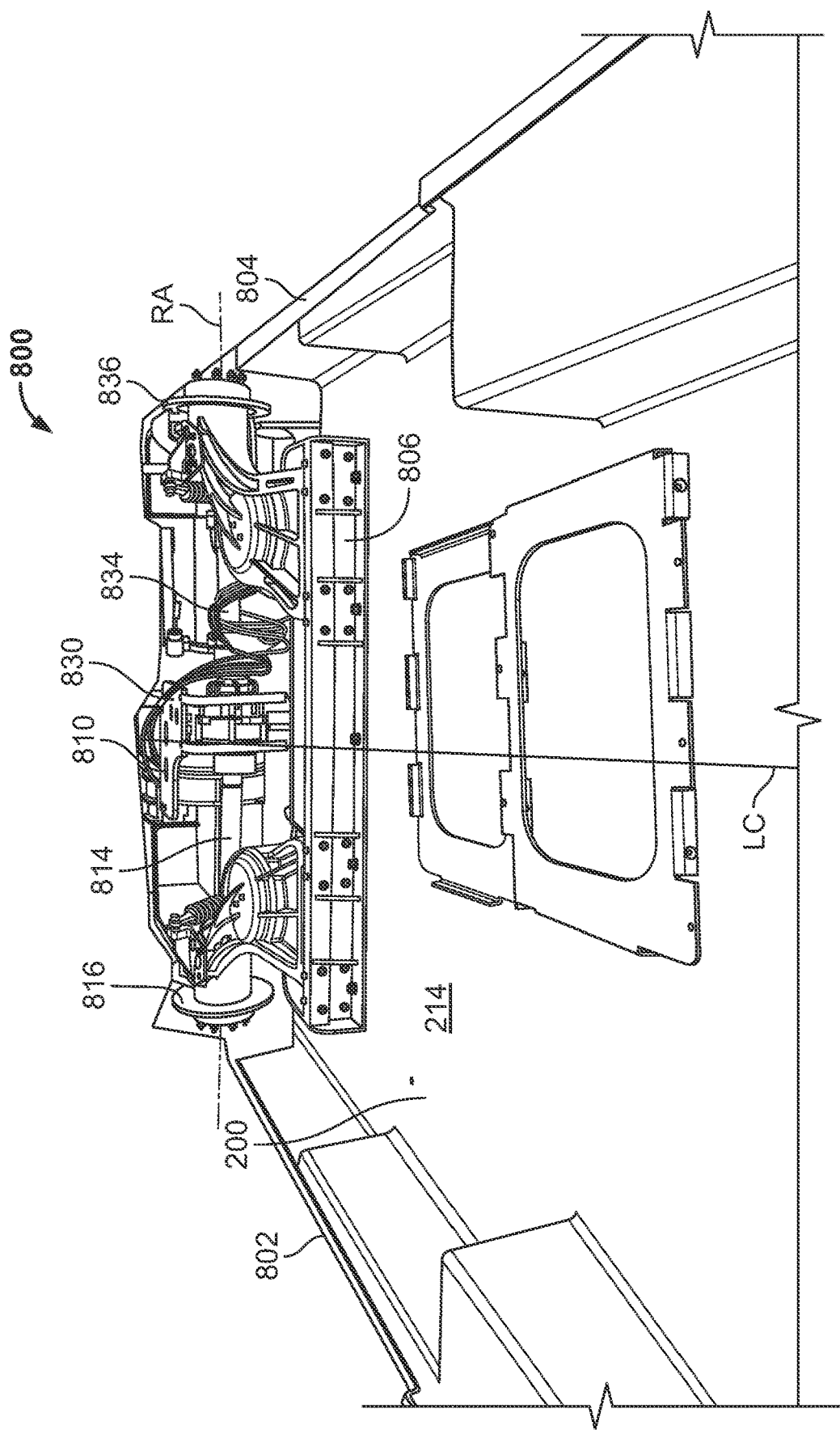
FIG. 8 is a perspective view of a powertrain unit that may be mounted to an underside of a monocoque or unibody of any electric vehicle of the disclosure.

As best seen in FIG. 8, any vehicle of the illustrative vehicle line 100 includes at least one powertrain unit 800 capable of driving movement of the vehicle relative to the underlying surface. In the illustrative embodiment, the at least one powertrain unit 800 is removably attached to the underside 214 of the monocoque 200. The at least one powertrain unit 800 includes a plurality of drive units (i.e., drive units 810, 830) coupled to wheels (e.g., wheels 112, 122, 132, 142, 152). As further discussed below, in use of the land vehicle, rotational power is provided to one wheel (e.g., one of the wheels 112, 122, 132, 142, 152) by the drive unit 810 and to another wheel (e.g., another one of the wheels 112, 122, 132, 142, 152) by the drive unit 830.

At least some of the vehicles (e.g., the vehicles 110, 140) of the illustrative line 100 may be embodied as, included in, or otherwise adapted for use with, electric utility vehicles. Furthermore, at least some of the vehicles (e.g., the vehicles 120, 130, 150) of the illustrative line 100 may be embodied as, included in, or otherwise adapted for use with, electric vehicles having enclosed stowage compartments. Of course, in other embodiments, it should be appreciated that the vehicles of the line 100 may be embodied as, included in, or otherwise adapted for use with, other suitable vehicles.

It should be appreciated each of the vehicles of the illustrative line 100 may be employed in a variety of applications. In some embodiments, one or more vehicles of the line 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, one or more vehicles of the line 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

It should be appreciated that the vehicles of the illustrative vehicle line 100 may each include one or more features that improve the experience of the driver, the owner, and/or maintenance personnel. Such features may include, but are not limited to, a low floor, a modular battery system, air springs and/or air ride features, an independent rear suspension, an independent front suspension, thermal battery management capability, flexible shelving options, desirable driver sightlines, LED lighting, telematics/driver feedback, features to facilitate maintenance, an aerodynamic body, and advanced safety systems. Further details regarding at least some of these features are provided herein.

Figure 2:
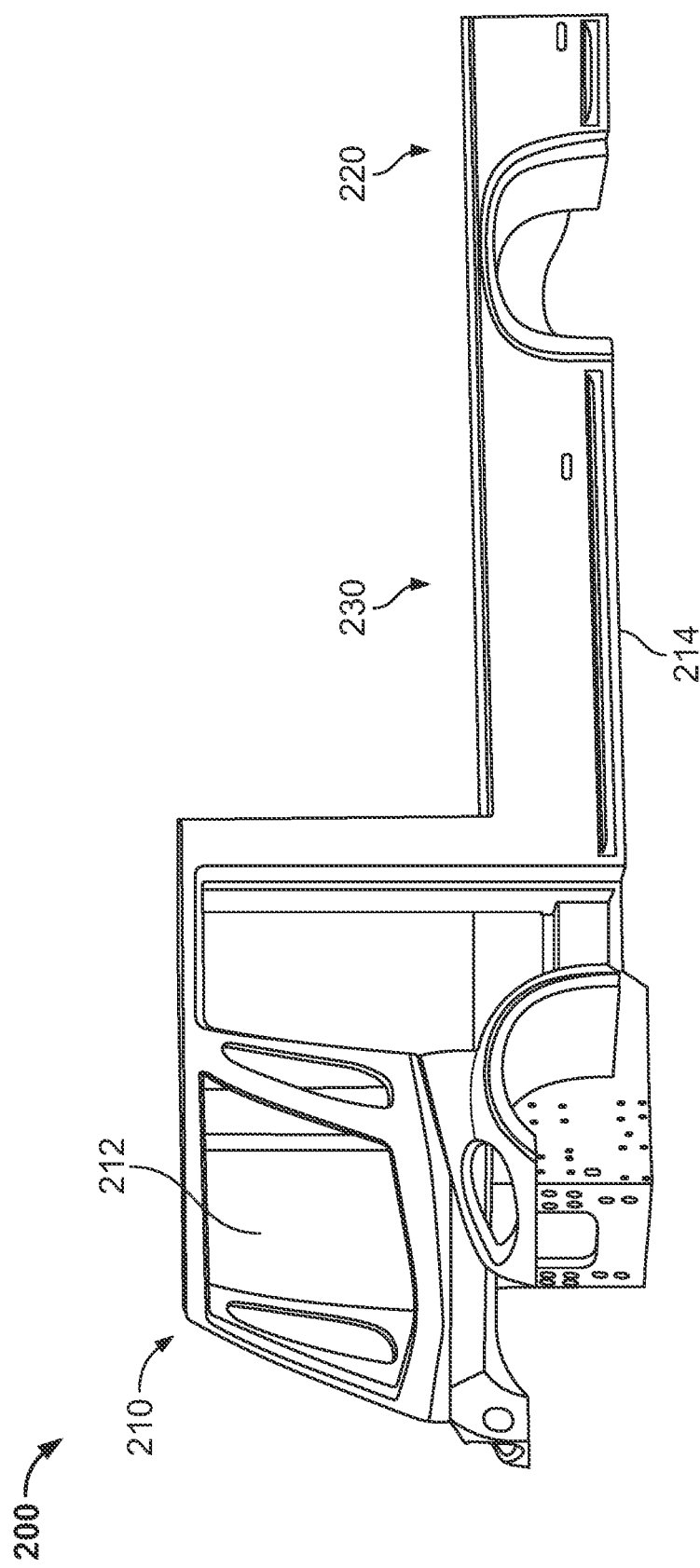
FIG. 2 is a perspective view of a monocoque or unibody that may be incorporated into any electric vehicle of the disclosure.

Referring now to FIG. 2, in addition to the front cage 210 and the rear floor 220, at least in some embodiments, the monocoque 200 includes an intermediate section 230 arranged between the front cage 210 and the rear floor 220. The intermediate section 230 may form a portion of a floor section arranged forward of the rear floor 220.

In the illustrative embodiment, the monocoque 200 combines what would traditionally be formed from one or more separate structures (e.g., one or more body components and one or more frame components) into a single-piece, monolithic structure. As such, any vehicle of the present disclosure incorporating the monocoque 200 does not include an internal chassis or frame structure that supports separate body components (e.g., panels, doors, etc.). Due at least in part to consolidation of body and frame components into an integrally-formed structure, the illustrative monocoque 200 may be associated with, or otherwise facilitate, improved manufacturability and/or simplified maintenance compared to other configurations.

Depending on the particular vehicle type and monocoque configuration, one or more dimensions of the intermediate section 230 of the monocoque 200 may vary. In one example, the intermediate section 230 may have a first length that at least partially defines a stowage compartment of a 650 cubic feet delivery vehicle (e.g., the vehicle 120). In another example, the intermediate section 230 may have a second length that at least partially defines a stowage compartment of a 1000 cubic feet delivery vehicle (e.g., the vehicle 130). In yet another example, the intermediate section 230 may have a third length that at least partially defines a stowage compartment of a 1200 cubic feet delivery vehicle (e.g., the vehicle 150).

Furthermore, depending on the particular vehicle type and monocoque configuration, the intermediate section 230 of the monocoque 200 may be omitted entirely. In such embodiments, the front cage 210 and the rear floor 220 may be integrally-formed as a single-piece, monolithic structure without the intermediate section 230 interposed therebetween. It should be appreciated that the utility vehicles 110 and 140 may each include a monocoque formed without the intermediate section 230, at least in some embodiments.

Figure 3:
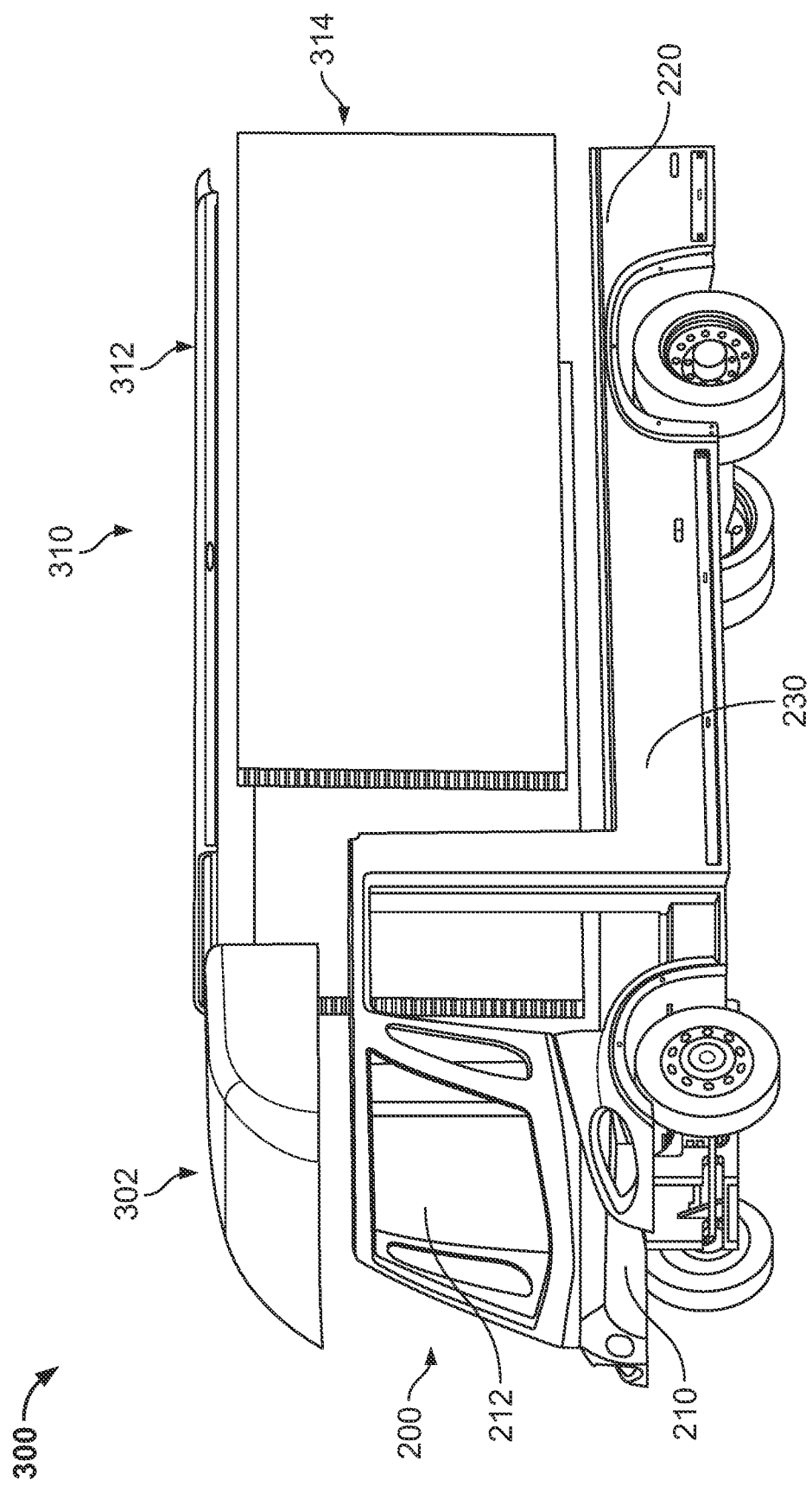
FIG. 3 is a partially exploded assembly view of an electric vehicle according to at least one embodiment of the disclosure.

Referring now to FIG. 3, a vehicle 300 incorporates the monocoque 200 with the intermediate section 230 arranged between the front cage 210 and the rear floor 220. Additionally, the vehicle 300 includes a cab hood 302 arranged above the front cage 210 to enclose the operator cabin 212 and a stowage compartment 310 arranged rearward of the front cage 210 and the cab hood 302. In the illustrative embodiment, the stowage compartment 310 is at least partially defined by the intermediate section 230 and the rear floor 220 and has a roof 312 and sidewalls 314. The illustrative vehicle 300 may be similar to any one of the vehicles 120, 130, 150 discussed above, at least in some embodiments.

Figure 7:
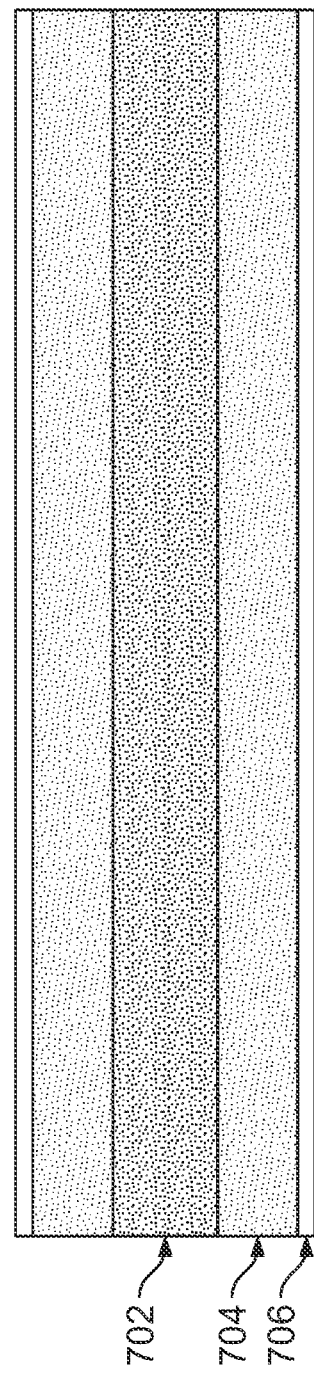
FIG. 7 is a partial schematic depiction of a composite structure that may be used to form a monocoque or unibody of any electric vehicle of the disclosure.

Because the monocoque 200 has a composite construction as indicated above, it should be appreciated that any vehicle described herein that incorporates the monocoque 200 (e.g., any of the vehicles 110, 120, 130, 140, 150, 300, 500) incorporates a composite structure (e.g., the structure 700 shown in FIG. 7). In the case of the vehicle 300, each of the intermediate section 230, the roof 312, and the sidewalls 314 is formed from composite materials and has a composite structure, at least in some embodiments. In those embodiments, each of the intermediate section 230, the roof 312, and the sidewalls 314 does not include metallic material.

Referring now to FIG. 4, a prior art delivery vehicle 400 includes a stowage compartment 410. The stowage compartment 410 includes a floor 412, a pair of sidewalls 414, a ceiling 416, and a refrigeration unit 418 at least partially housed by the stowage compartment 410 and configured to cool the stowage compartment 410. The rear end of the vehicle 400 includes a landing 404 and a step 406 that leads to the floor 412 of the stowage compartment 410.

As depicted in FIG. 4, the landing 404 has a landing height 424 above ground level 402 and the step 406 has a step height 426 above the landing 404. The floor 412 has a floor height 422 above the ground level 402 that includes both the landing height 424 and the step height 426. Typically, the landing height 424 is about 25 inches, the step height 426 is about ten inches, and the floor height 422 is about 35 inches.

Referring now to FIG. 5, a delivery vehicle 500 may include a monocoque (e.g., the monocoque 200) described above with reference to FIG. 2. Furthermore, in some embodiments, the vehicle 500 may be similar to one or more of the vehicles 120, 130, 150 described above. In any case, the illustrative delivery vehicle 500 includes a stowage compartment 510 having a floor 512, a pair of sidewalls 514, and a ceiling 516, as well as a refrigeration unit 518 housed by the stowage compartment 510. Unlike the prior art delivery vehicle 400, however, the vehicle 500 lacks a step corresponding to the step 406. As such, the floor 512 has a floor height 522 that substantially corresponds to, and may be equal to, the landing height 424. The floor height 522 may be less than thirty inches, such as in the range of 22 to 28 inches, for example. A pair of wheel wells 530 formed within the stowage compartment 510 are offset from one another by a separation distance 532. In certain embodiments, the separation distance 532 may be about 50 inches.

In some cases, the prior art delivery vehicle 400 suffers from one or more disadvantages not associated with the illustrative vehicle 500. In one respect, the sidewalls 414 and the ceiling 416 of the prior art vehicle 400 are typically formed of metallic material such as aluminum, for example, which is a poor thermal insulator. As such, the compartment 410 may be poorly insulated and have a tendency to adopt the temperature of the ambient environment relatively quickly. That may be especially the case in the summer when radiant heat from the sun supplements the ambient hot air to exacerbate the warming of the compartment 410. In contrast, the sidewalls 514 and the ceiling 516 of the illustrative vehicle 500 are formed of composite materials, which exhibit superior insulating characteristics compared to metallic material such as aluminum. Accordingly, the compartment 510 is insulated from the ambient environment to a greater degree than the compartment 410. That insulation may be particularly advantageous in cases in which the vehicle 500 is a refrigerated vehicle such as a food delivery vehicle, for instance. It should be appreciated that the insulating properties of the compartment 510 may ease the cooling burden on the refrigeration unit 518 and thereby increase performance of the refrigeration unit 518. Additionally, in certain circumstances, increased performance of the refrigeration unit 518 may enable the vehicle 500 to be provided with a smaller refrigeration unit 518 than would typically be required by the prior art vehicle 400.

Another drawback associated with the prior art vehicle 400 is the elevated nature of the floor 412 relative to the ground level 402. It should be appreciated that the elevated floor 412 is not merely a design choice but rather a feature often necessitated to accommodate inclusion of the internal chassis or frame, the powertrain, and associated components. Put another way, to accommodate the mounting of a conventional internal combustion engine and other powertrain components (e.g., a transmission, transaxle, and/or a differential) to an internal chassis, the floor 412 is elevated above the ground level 402 by the floor height 422. Consequently, the elevated floor 412 reduces the storage capacity and/or volume of the stowage compartment 410 and requires the provision of the step 406. Delivery personnel using the vehicle 400 must therefore step up onto the landing 404 and ascend the step 406 in order to access the compartment 410.

The illustrative vehicle 500 obviates a number of the aforementioned disadvantages by eliminating the necessity of the elevated floor 412. Due in part to the provision of the monocoque 200 as a single-piece, monolithically formed structure having a relatively lightweight composite construction, and due in part to the absence of powertrain components typically provided in other configurations (e.g., a central drive shaft beneath the underside 214 of the monocoque 200 that provides a rotational input to a differential), the floor 512 need not be elevated above the ground level like the floor 412. As a result, the vehicle 500 allows increased stowage capacity of the stowage compartment 510 to be achieved without raising the ceiling 516. Moreover, because a step similar to the step 406 may be omitted from the vehicle 500, the floor height 522 corresponds to the landing height 424 of the conventional vehicle 400, and delivery personnel may avoid the effort of ascending both the landing 404 and the step 406 to access the stowage compartment 510 of the vehicle 500. Notably, it should be appreciated that a rear bumper of the vehicle 500 may be slightly lower than the floor 512 and that delivery personnel may access the compartment 510 by first stepping on the rear bumper. In some embodiments, the rear bumper may have a height of about 20 inches above the ground level, whereas the floor 512 may have a height of about 25 inches above the ground level.

Referring now to FIG. 6, in the United States, trucks are often classified according to their gross vehicular weight rating (GVWR). Those truck classifications, the associated duty classifications, and the corresponding GVWRs are illustrated in the table 600. In the illustrative embodiment, one or more of the vehicles 110, 120, 130, 140, 150 has a GVWR (i.e., accounting for the weight of the truck when empty and the payload carrying capacity of the truck when full) of between 6,000 pounds and 19,800 pounds. In some embodiments, one or more of the vehicles 110, 120, 130, 140, 150 has a GVWR of between 10,001 pounds and 14,000 pounds such that one or more of the vehicles 110, 120, 130, 140, 150 is embodied as, or otherwise includes, a Class 3 truck. In one particular example, in some embodiments, the 1000 cubic foot capacity vehicle 130 weighs roughly 6,500 pounds when empty and has a 6,000 pound payload capacity such that the vehicle 130 has a GVWR of about 12,500 pounds. Of course, it should be appreciated that in other embodiments, the vehicle line 100 may include one or more vehicles in Class 3, one or more vehicles in Class 4, and/or one or more vehicles in Class 5.

In some embodiments, the systems and methods described herein may find particular utility in connection with delivery vehicles in Classes 3 through 5. For example, the method 1000 described below may be utilized in connection with a delivery vehicle having a GVWR between 10,001 pounds and 19,500 pounds. The stowage capacity of such a vehicle may be between 450 cubic feet and 1200 cubic feet. In certain embodiments, the stowage compartment (e.g., the compartment 510) of the vehicle may be isolated from the operator cabin (e.g., the operator cabin 212) of the vehicle.

Referring now to FIG. 7, any vehicle of the present disclosure includes a monocoque having the composite structure 700. In the illustrative embodiment, the composite structure 700 incorporates one or more relatively lightweight, low-density materials to impart a relatively lightweight construction to the vehicle. As discussed below, the illustrative composite structure 700 includes one or more of the following: balsa wood, plastic, fiberglass, resin, Kevlar, honeycomb, and carbon fiber. The composite structure 700 does not include, and is not formed from, metallic material, at least in some embodiments. In those embodiments, the monocoque (e.g., the monocoque 200) incorporating the composite structure 700 does not include metallic material.

The illustrative composite structure 700 includes a core 702 and a shell 704 that at least partially surrounds the core 702. In the illustrative embodiment, the core 702 is formed from balsa wood and/or one or more of the following composite, non-metallic materials: unidirectional fiberglass, multi-directional fiberglass, Kevlar, carbon fiber, plastic, honeycomb, or other suitable composite, non-metallic materials. Of course, in other embodiments, the core 702 may be formed from other suitable materials to provide a relatively lightweight construction to the composite structure 700. The illustrative shell 704 is formed from fiberglass and resin. However, in other embodiments, the shell 704 may be formed from other suitable materials. Additionally, in the illustrative embodiment, the composite structure 700 includes a laminate layer 706 that at least partially covers the shell 704.

It should be appreciated that the composite structure 700 used to form the monocoque of any vehicle of the present disclosure offers a number of advantages over multi-piece metallic constructions of conventional vehicles. In one respect, the single-piece monolithic structure formed with the composite structure 700 has fewer parts and offers greater structural simplicity than vehicle constructions requiring multiple parts. In another respect, the structural simplicity afforded by the composite structure 700 may facilitate maintenance and improve structural efficiency. In yet another respect, due to a lack of metallic material, the composite structure 700 may minimize or eliminate rust and/or corrosion and thereby have a service life that exceeds the service life of vehicles having conventional constructions. In some instances, monocoques incorporating composite structures 700 consistent with the teachings of the present disclosure may have service lives of 20 years or more.

Referring now to FIG. 8, in the illustrative embodiment, a single powertrain unit 800 is coupled to the underside (e.g., the underside 214) of a frame structure (e.g., the monocoque 200) to drive a pair of wheels arranged on opposite sides 802, 804 of the frame structure. In some embodiments, the powertrain unit 800 is positioned to drive a pair of rear wheels of any vehicle of the present disclosure. In such embodiments, the powertrain unit 800 may be incorporated into, form a portion of, or otherwise be adapted for use with, a rear suspension of the vehicle. In other embodiments, however, the powertrain 800 may be positioned to drive a pair of front wheels of any vehicle disclosed herein. In those embodiments, the powertrain unit 800 may be incorporated into, form a portion of, or otherwise be adapted for use with, a front suspension of the vehicle.

In some embodiments, any vehicle of the present disclosure may incorporate multiple powertrain units 800. In one example, one powertrain unit 800 may be coupled to the underside 214 of the frame structure 200 to drive a pair of rear wheels arranged on opposite sides 802, 804 of the frame structure 200, and another powertrain unit 800 may be coupled to the underside 214 of the frame structure 200 to drive a pair of front wheels arranged on opposite sides 802, 804 of the frame structure 200. Of course, it should be appreciated that in other embodiments, multiple powertrain units 800 may be positioned in contact with the underside 214 of the frame structure 200 at other suitable locations to drive the wheels of any vehicle contemplated herein.

In the illustrative embodiment, a cradle 806 of the powertrain unit 800 is removably affixed or attached directly to the underside 214 of the frame structure 200. The illustrative cradle 806 is embodied as, or otherwise includes, any structure or collection of structures capable of supporting a number of separate components of the powertrain unit 800 that are coupled to the cradle 806 as described below. Furthermore, as described in greater detail below, upon removal of the cradle 806 from the underside 214 of the frame structure 200, the components of the powertrain 800 coupled thereto are detached from the frame structure 200 to facilitate access to those components for maintenance, servicing, repair, and/or replacement, among other things. In some embodiments, the cradle 806 may be sized to at least partially house the powertrain components secured thereto. In such embodiments, the cradle 806 may be embodied as, or otherwise include, a housing, casing, enclosure, or the like.

The illustrative powertrain unit 800 includes the drive unit 810, an axle 814 coupled to the drive unit 810 to be rotatably driven by the drive unit 810, and a wheel hub 816 coupled to the axle 814 and configured to support a wheel for rotation about a rotational axis RA. The drive unit 810 is embodied as, or otherwise includes, any device or collection of devices capable of producing rotational power to drive rotation of a wheel supported by the wheel hub 816 through the axle 814 and the wheel hub 816. In some embodiments, the drive unit 810, the axle 814, and the wheel hub 816 may cooperatively provide, or otherwise establish, a drivetrain for transmitting rotational power to the wheel supported by the wheel hub 816. In any case, in the illustrative embodiment, the drive unit 810 (e.g., a casing or housing thereof) is mounted to and secured to the cradle 806. The axle 814 and the wheel hub 816 are coupled to the drive unit 810 to permit rotation of those components relative to the cradle 806 while receiving support therefrom in use of the vehicle.

In the illustrative embodiment, the drive unit 810 is embodied as, or otherwise includes, an electric motor. For example, the drive unit 810 may be embodied as, or otherwise include, a brushless DC motor, a permanent magnet DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. In other embodiments, the drive unit 810 may be embodied as, or otherwise include, another suitable electric motor.

The illustrative powertrain unit 800 includes the drive unit 830, an axle 834 coupled to the drive unit 830 to be rotatably driven by the drive unit 830, and a wheel hub 836 coupled to the axle 834 and configured to support a wheel for rotation about the rotational axis RA. The drive unit 830 is embodied as, or otherwise includes, any device or collection of devices capable of producing rotational power to drive rotation of a wheel supported by the wheel hub 836 through the axle 834 and the wheel hub 836. In some embodiments, the drive unit 830, the axle 834, and the wheel hub 836 may cooperatively provide, or otherwise establish, a drivetrain for transmitting rotational power to the wheel supported by the wheel hub 836. In any case, in the illustrative embodiment, the drive unit 830 (e.g., a casing or housing thereof) is mounted to and secured to the cradle 806. The axle 834 and the wheel hub 836 are coupled to the drive unit 830 to permit rotation of those components relative to the cradle 806 while receiving support therefrom in use of the vehicle.

In the illustrative embodiment, the drive unit 830 is embodied as, or otherwise includes, an electric motor. For example, the drive unit 830 may be embodied as, or otherwise include, a brushless DC motor, a permanent magnet DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. In other embodiments, the drive unit 830 may be embodied as, or otherwise include, another suitable electric motor.

In the illustrative embodiment, when mounted to and/or supported by the cradle 806, the drive unit 810, the axle 814, the wheel hub 816, the drive unit 830, the axle 834, and the wheel hub 836 are aligned along the rotational axis RA. When the cradle 806 is attached to the underside 214 of the frame structure 200, the components 810, 814, 816, 830, 834, 836 are aligned along a lateral axis of the vehicle that is coaxial with the rotational axis RA. In some embodiments, the rotational axis RA may define, or otherwise be associated with, a common rotational axis of a pair of rear wheels of the vehicle. Additionally, in some embodiments, the rotational axis RA may define, or otherwise be associated with, a common rotational axis of a pair of front wheels of the vehicle.

In the illustrative embodiment, each of the drive units 810, 830 is at least partially aligned with a longitudinal centerline LC of the underside 214 of the frame structure 200. As such, each of the drive units 810, 830 is at least partially centered between the sides 802, 804 of the frame structure 200 when the cradle 806 is attached to the frame structure 200. Each of the drive units 810, 830 extends outwardly away from, and is located at least partially beneath, the longitudinal centerline LC relative to the underlying surface.

It should be appreciated that any electric vehicle of the present disclosure incorporating the powertrain unit 800 does not include a number of devices typically present in other land vehicle powertrain configurations. In one respect, each electric vehicle contemplated herein does not include an internal combustion engine or powerplant. In another respect, any electric vehicle of the present disclosure does not include an engine or powerplant housed by the front cage 210 and positioned above an underside 214 of the monocoque 200. In yet another respect, each electric vehicle contemplated herein does not include a drive shaft or the like arranged along the longitudinal centerline LC that provides a rotational input to the powertrain unit 800. Consequently, in comparison to conventional configurations having powertrain components such as internal combustion engines, transmissions, transaxles, and/or differentials, inclusion of the powertrain unit 800 in any vehicle disclosed herein may offer greater manufacturability and reduced design complexity, among other advantages.

As suggested above, in the illustrative embodiment, the drive unit 810, the axle 814, the wheel hub 816, the drive unit 830, the axle 834, and the wheel hub 836 are mounted to the cradle 806 such that the components 810, 814, 816, 830, 834, 836 are detached from the frame structure 200 upon removal of the cradle 806 from the underside 214 thereof. Thus, the powertrain unit 800 is easily detachable from the frame structure 200 to facilitate access to those components for maintenance, servicing, repair, and/or replacement, which provides an advantage not readily achieved with conventional land vehicle powertrain configurations.

It should be appreciated that in some embodiments, the powertrain unit 800 may include components in addition to those mentioned above. Such components may include, but are not limited to, bearings, seals, gaskets, rods, brackets, shafts, rings, spacers, cams, gears, spindles, spokes, teeth, flanges, blocks, belts, pulleys, drums, or the like. Additional components of the powertrain unit 800 may be selected and/or employed to permit translation and/or rotation of powertrain components, or to resist translation and/or rotation of those components, as the case may be.

Figure 9:
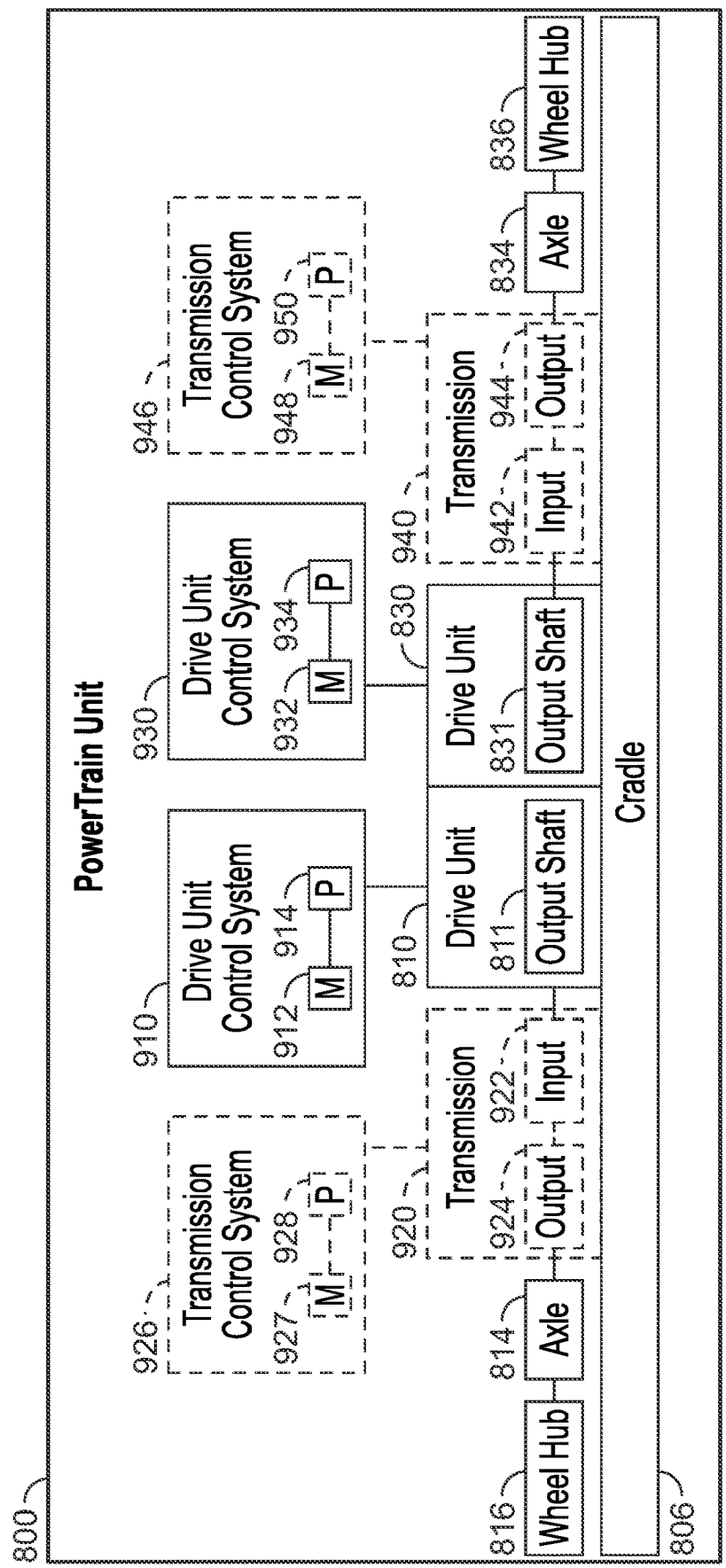
FIG. 9 is a diagrammatic depiction of the powertrain unit of FIG. 8.

Referring now to FIG. 9, in some embodiments, the powertrain unit 800 may include a transmission 920 coupled between the drive unit 810 and the axle 814 and a transmission 940 coupled between the drive unit 830 and the axle 834. In other embodiments, however, the transmissions 920, 940 may be omitted from the powertrain unit 800.

The illustrative transmission 920 is embodied as, or otherwise includes, any device or collection of devices capable of transmitting rotational power supplied by the drive unit 810 to the axle 814. In some embodiments, the transmission 920 may include transmission gearing, such as one or more simple or compound epicyclic gearsets, for example, that are arranged between an input 922 (e.g., an input shaft) and an output 924 (e.g., an output shaft) of the transmission 920. The input 922 of the transmission 920 may be coupled to an output shaft 811 of the drive unit 810, and the output 924 of the transmission 920 may be coupled to the axle 814.

In some embodiments, the transmission 920 may include one or more torque transmitting mechanisms (e.g., clutches or brakes) that are engageable in combination with one another to establish one or more speed ratios at which rotational power may be transmitted from the drive unit 810 to the axle 814. It should be appreciated, of course, that the one or more speed ratios may be associated with, or otherwise correspond to, one of more operating ranges or regimes of the transmission 920, such as forward, neutral, and/or reverse operating ranges, for example. In such embodiments, an electro-hydraulic control system may be used to control operation of the one or more torque transmitting mechanisms to establish the one or more speed ratios. Additionally, in some embodiments, the transmission 920 may include a variable-ratio device such as a pulley-based variator, a planetary-type ball variator, or a toroidal variator, for example. In those embodiments, the transmission 920 may be embodied as, or otherwise include, a continuously-variable transmission or an infinitely-variable transmission.

In some embodiments, a transmission control system 926 may be employed to control operation of the transmission 920. The transmission control system 926 may be embodied as, or otherwise include, an electro-hydraulic control system, at least in some embodiments. Among other things, the transmission control system 926 may include memory 927 and a processor 928 communicatively coupled to the memory 927.

The illustrative transmission 940 is embodied as, or otherwise includes, any device or collection of devices capable of transmitting rotational power supplied by the drive unit 830 to the axle 834. In some embodiments, the transmission 940 may include transmission gearing, such as one or more simple or compound epicyclic gearsets, for example, that are arranged between an input 942 (e.g., an input shaft) and an output 944 (e.g., an output shaft) of the transmission 940. The input 942 of the transmission 940 may be coupled to an output shaft 831 of the drive unit 830, and the output 944 of the transmission 940 may be coupled to the axle 834.

In some embodiments, the transmission 940 may include one or more torque transmitting mechanisms (e.g., clutches or brakes) that are engageable in combination with one another to establish one or more speed ratios at which rotational power may be transmitted from the drive unit 830 to the axle 834. It should be appreciated, of course, that the one or more speed ratios may be associated with, or otherwise correspond to, one of more operating ranges or regimes of the transmission 940, such as forward, neutral, and/or reverse operating ranges, for example. In such embodiments, an electro-hydraulic control system may be used to control operation of the one or more torque transmitting mechanisms to establish the one or more speed ratios. Additionally, in some embodiments, the transmission 940 may include a variable-ratio device such as a pulley-based variator, a planetary-type ball variator, or a toroidal variator, for example. In those embodiments, the transmission 940 may be embodied as, or otherwise include, a continuously-variable transmission or an infinitely-variable transmission.

In some embodiments, a transmission control system 946 may be employed to control operation of the transmission 940. The transmission control system 946 may be embodied as, or otherwise include, an electro-hydraulic control system, at least in some embodiments. Among other things, the transmission control system 946 may include memory 948 and a processor 950 communicatively coupled to the memory 948.

In the illustrative embodiment, a drive unit control system 910 may be employed to control operation of the drive unit 810. Among other things, the drive unit control system 910 may include memory 912 and a processor 914 communicatively coupled to the memory 912.

In the illustrative embodiment, a drive unit control system 930 may be employed to control operation of the drive unit 830. Among other things, the drive unit control system 930 may include memory 932 and a processor 934 communicatively coupled to the memory 932.

Each of the memory devices 912, 927, 932, 948 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, each of the memory devices 912, 927, 932, 948 may be embodied as a block addressable memory, such as those based on NAND or NOR technologies. Each of the memory devices 912, 927, 932, 948 may also include future generation nonvolatile devices, such as a three dimensional crosspoint memory device (e.g., Intel 3D XPoint™ memory), or other byte addressable write-in-place nonvolatile memory devices. In some embodiments, each of the memory devices 912, 927, 932, 948 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

Each of the processors 914, 928, 934, 950 may be embodied as, or otherwise include, any type of processor, controller, or other compute circuit capable of performing various tasks. For example, each of the processors 914, 928, 934, 950 may be embodied as a single or multi-core processor(s), a microcontroller, or other processor or processing/controlling circuit. In some embodiments, each of the processors 914, 928, 934, 950 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, each of the processors 914, 928, 934, 950 may be embodied as, or otherwise include, a high-power processor, an accelerator co-processor, or a storage controller. In some embodiments still, each of the processors 914, 928, 934, 950 may include more than one processor, controller, or compute circuit.

Figure 10:
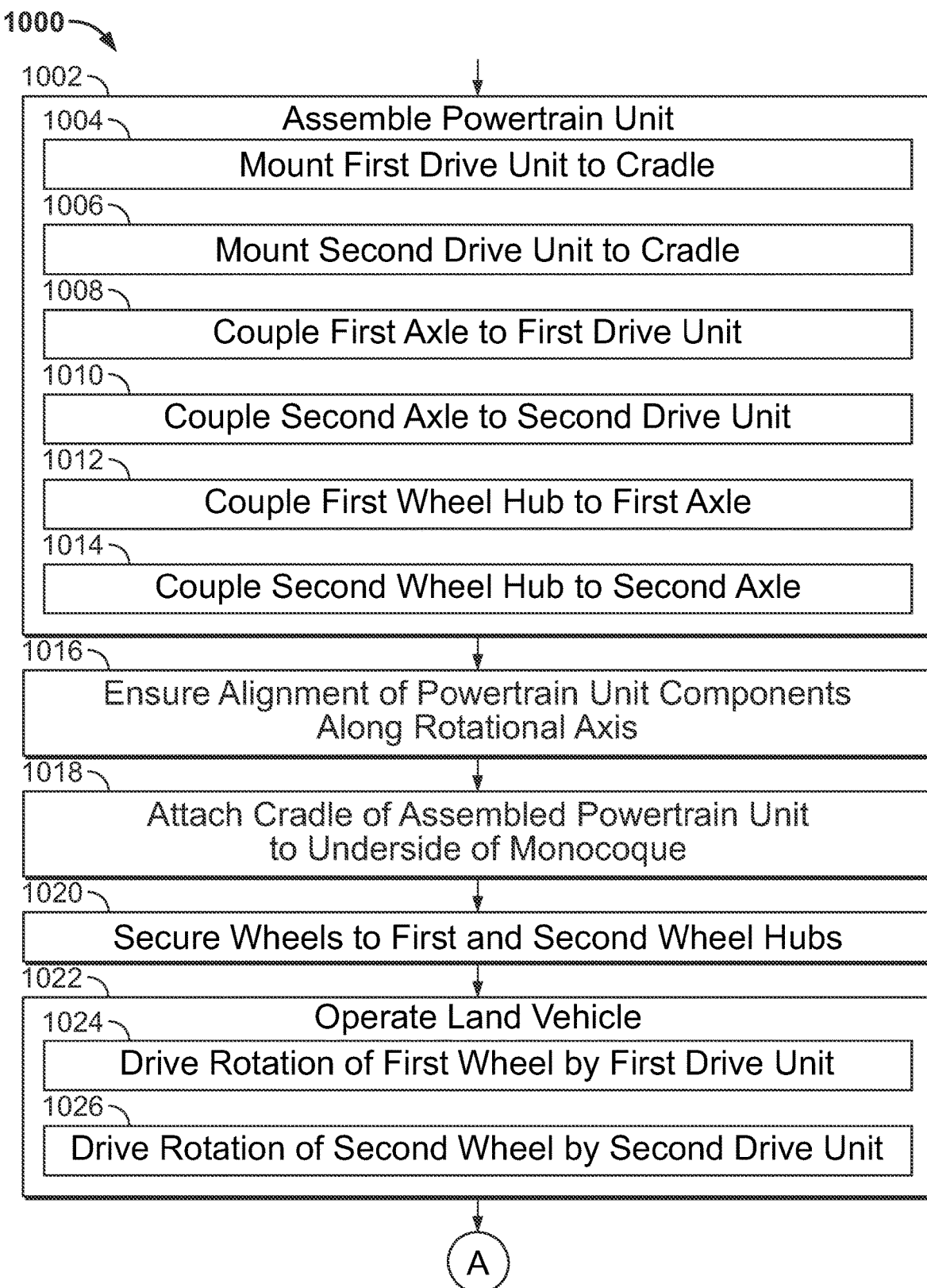
FIG. 10 is a simplified flowchart of one portion of a method of using a land vehicle according to one embodiment of the disclosure.
Figure 11:
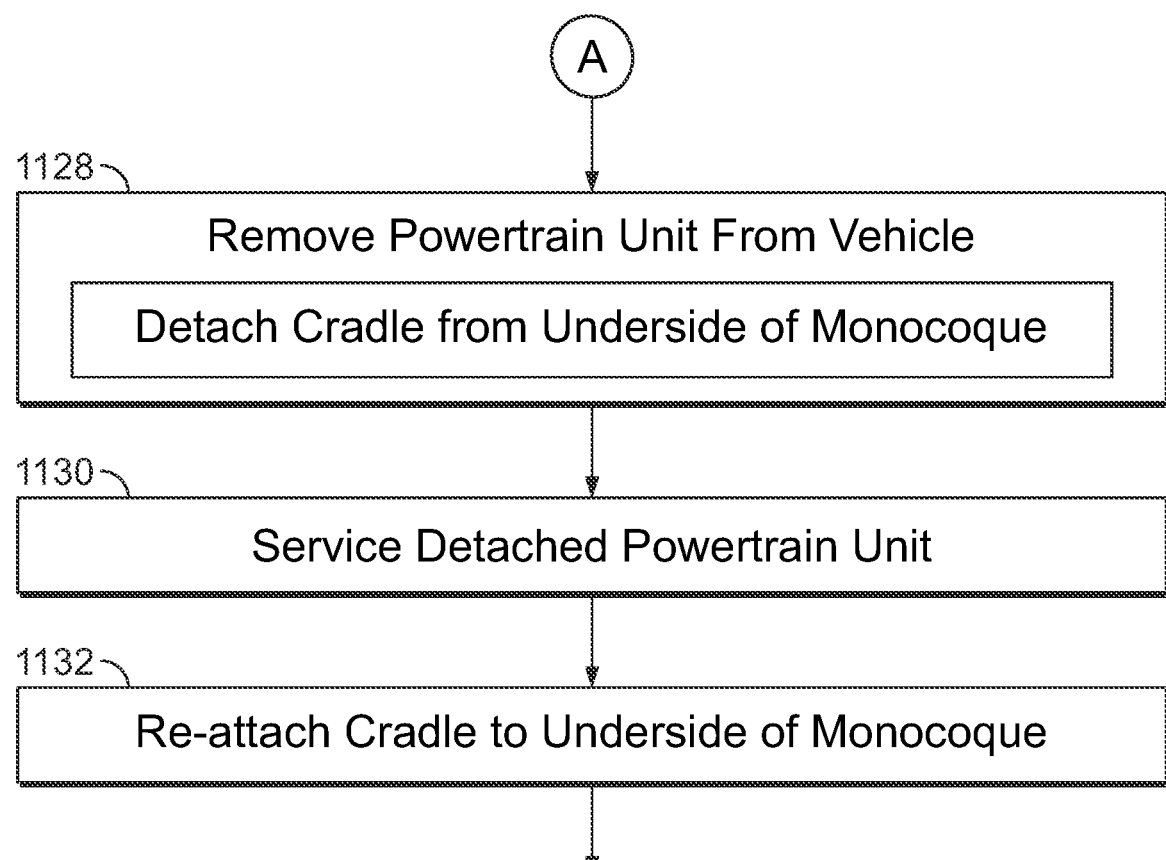
FIG. 11 is diagrammatic view of another portion of the method of FIG. 10.

Referring now to FIGS. 10 and 11, an illustrative method 1000 of using a land vehicle is depicted. The method 1000 corresponds to, or is otherwise associated with, performance of the blocks described below in the illustrative sequence of FIGS. 10 and 11. It should be appreciated, however, that the method 1000 may be performed in one or more sequences different from the illustrative sequence. Furthermore, it should be appreciated that one or more of the blocks described below may be executed contemporaneously and/or in parallel with one another. In some embodiments, the method 1000 may be performed manually by one or more operators. In other embodiments, the method 1000 may be embodied as, or otherwise include, a set of instructions that are performed by one or more automated control systems, such as one or more of the aforementioned control systems 910, 926, 930, 946.

The illustrative method 1000 begins with block 1002. In block 1002, the operator(s) or the control system(s) assembles the powertrain unit (e.g., the powertrain unit 800). To do so, the operator(s) or the control system(s) perform blocks 1004, 1006, 1008, 1010, 1012, and 1014. In block 1004, the operator(s) or the control system(s) mounts the first drive unit (e.g., the drive unit 810) to the cradle (e.g., the cradle 806). In block 1006, the operator(s) or the control system(s) mounts the second drive unit (e.g., the drive unit 830) to the cradle. In block 1008, the operator(s) or the control system(s) couples the first axle (e.g., the axle 814) to the first drive unit. In block 1010, the operator(s) or the control system(s) couples the second axle (e.g., the axle 834) to the second drive unit. In block 1012, the operator(s) or the control system(s) couples the first wheel hub (e.g., the wheel hub 816) to the first axle. In block 1014, the operator(s) or the control system(s) couples the second wheel hub (e.g., the wheel hub 836) to the second axle. Subsequent to the performance of block 1002, the method 1000 proceeds to block 1016.

In block 1016 of the illustrative method 1000, the operator(s) or the control system(s) ensures alignment of the powertrain unit components (e.g., the components 810, 814, 816, 830, 834, 836) along the rotational axis (e.g., the axis RA) of the wheels to be mounted to the powertrain unit. From block 1016, the method 1000 subsequently proceeds to block 1018.

In block 1018 of the illustrative method 1000, the operator(s) or the control system(s) attaches the cradle of the assembled powertrain unit directly to the underside (e.g., the underside 214) of the frame structure or monocoque (e.g., the frame structure 200) such that the powertrain unit is disposed in confronting relation with the underlying surface (e.g., a support surface of the vehicle). In some embodiments, to perform block 1018, the operator(s) or the control system(s) ensures that the powertrain unit is attached to the underside of the frame structure such that the drive units are at least partially aligned with the longitudinal centerline (e.g., the centerline LC) thereof. In any case, from block 1018, the method 1000 subsequently proceeds to block 1020.

In block 1020 of the illustrative method 1000, the operator(s) or the control system(s) secures the wheels to the wheel hubs. From block 1020, the method 1000 subsequently proceeds to block 1022.

In block 1022 of the illustrative method 1000, the operator(s) or the control system(s) operates the land vehicle. It should be appreciated that in doing so, at least in some embodiments, the operator(s) or the control system(s) drives rotation of the wheel coupled to the first hub (e.g., the hub 816) in block 1024 and drives rotation of the wheel coupled to the second hub (e.g., the hub 836) in block 1026. Furthermore, it should be appreciated that performance of blocks 1024 and 1026 may provide independent control of the two drive units (e.g., the drive units 810, 830) to selectively drive independent rotation of the wheels coupled to the powertrain unit (e.g., the powertrain unit 800). In addition, it should be apparent that the performance of blocks 1024 and 1026 may entail selectively driving rotation of the wheels coupled to the powertrain unit based on a variety of inputs, such as environmental monitors and user inputs, among other things. Finally, in some circumstances, performance of blocks 1024 and 1026 may entail arresting or resisting rotation of the wheels coupled to the powertrain unit. In any case, from block 1022, the method 1000 subsequently proceeds to block 1128.

In block 1128 of the illustrative method 1000, the operator(s) or the control system(s) removes the powertrain unit (e.g., the unit 800) from the land vehicle. To do so, in the illustrative embodiment, the operator(s) or the control system(s) detaches the cradle (e.g., the cradle 806) from the underside (e.g., the underside 214) of the frame structure (e.g., the monocoque 200). From block 1128, the method 1000 subsequently proceeds to block 1130.

In block 1130 of the illustrative method 1000, the operator(s) or the control system(s) services the detached the powertrain unit. It should be appreciated that any servicing associated with block 1130 may include routine maintenance activities, component repair and/or replacement, retrofitting, or other any task that may necessitate removal of the powertrain unit from the vehicle. Regardless, from block 1130, the method 1000 proceeds to block 1132.

In block 1132 of the illustrative method 1000, the operator(s) or the control system(s) re-attaches the cradle to the underside of the frame structure. Following performance of block 1132, the vehicle may be operated as discussed above with reference to block 1022.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A land vehicle comprising:
a frame structure including a front cage that defines an operator cabin and a rear floor positioned rearward of the front cage, wherein the frame structure supports a plurality of wheels to permit movement of the land vehicle relative to an underlying surface in use of the land vehicle, and wherein an underside of the frame structure is disposed in confronting relation with the underlying surface; and
at least one powertrain unit removably attached to the underside of the frame structure,
wherein:
the at least one powertrain unit includes a plurality of drive units coupled to the plurality of wheels,
in use of the land vehicle, rotational power is provided to one of the plurality of wheels by a first drive unit of the plurality of drive units and to another one of the plurality of wheels by a second drive unit of the plurality of drive units,
the first drive unit is at least partially arranged on a first side of the frame structure to provide rotational power to a first one of the plurality of wheels arranged on the first side of the frame structure,
the second drive unit is at least partially arranged on a second side of the frame structure opposite the first side to provide rotational power to a second one of the plurality of wheels arranged on the second side of the frame structure,
the first drive unit is positioned closer to the first one of the plurality of wheels than the second one of the plurality of wheels,
the second drive unit is positioned closer to the second one of the plurality of wheels than the first one of the plurality of wheels,
the first drive unit is coupled to the first one of the plurality of wheels without any transmission gearing interposed therebetween;
the second drive unit is coupled to the second one of the plurality of wheels without any transmission gearing interposed therebetween;
the at least one powertrain unit includes a cradle removably attached to the underside of the frame structure that has an open tray;
the first drive unit and the second drive unit are directly affixed to the open tray such that the first drive unit and the second drive unit extend outwardly beneath the open tray and are not completely enclosed by the open tray; and
the at least one powertrain unit includes a first axle coupled to the first drive unit to be driven for rotation by the first drive unit that is arranged entirely outside of the open tray.

2. The land vehicle of claim 1, wherein the frame structure is a monocoque having a single-piece, monolithic structure that does not include an internal chassis, wherein the monocoque includes a core and a shell that at least partially surrounds the core, wherein the core includes balsa wood and one or more composite, non-metallic materials, and wherein the shell includes resin and fiberglass.

3. The land vehicle of claim 2, wherein the land vehicle has a gross vehicular weight rating (GVWR) of between 6,000 pounds and 19,800 pounds.

4. The land vehicle of claim 3, wherein a height of the rear floor above the underlying surface is between 18 inches and 35 inches.

5. The land vehicle of claim 1, wherein:
the second drive unit is coupled to a second axle of the at least one powertrain unit to drive rotation of the second axle; and
the first drive unit, the first axle, the second drive unit, and the second axle are supported by the cradle such that the first drive unit, the first axle, the second drive unit, and the second axle are aligned along a lateral axis.

6. The land vehicle of claim 5, wherein the first axle is coupled to a first wheel hub to which the first one of the plurality of wheels is mounted for rotation about the lateral axis, wherein the second axle is coupled to a second wheel hub to which the second one of the plurality of wheels is mounted for rotation about the lateral axis, and wherein in use of the land vehicle, rotation of the first one of the plurality of wheels about the lateral axis is driven by the first drive unit independently of rotation of the second one of the plurality of wheels about the lateral axis driven by the second drive unit.

7. The land vehicle of claim 5, wherein each of the first drive unit and the second drive unit is an electric motor.

8. The land vehicle of claim 5, wherein the first drive unit, the first axle, the second drive unit, and the second axle are mounted to the cradle such that the first drive unit, the first axle, the second drive unit, and the second axle are detached from the frame structure upon removal of the cradle from the underside of the frame structure.

9. The land vehicle of claim 1, wherein the first side of the frame structure is arranged opposite the second side of the frame structure with respect to a longitudinal centerline of the underside of the frame structure.

10. The land vehicle of claim 9, wherein the land vehicle does not include a drive shaft that is arranged along the longitudinal centerline.

11. The land vehicle of claim 10, wherein the vehicle does not include an internal combustion engine.

12. The land vehicle of claim 1, wherein the first drive unit and the second drive unit are aligned along, and positioned on, a common rotational axis of the first one and the second one of the plurality of wheels.

13. A powertrain unit for a land vehicle that includes a frame structure supporting a plurality of wheels to permit movement of the vehicle relative to an underlying surface in use of the land vehicle, the powertrain unit comprising:
a cradle removably attachable directly to an underside of the frame structure to dispose the cradle in confronting relation with the underlying surface in use of the powertrain unit;
a first drive unit mounted to the cradle to provide rotational power to a first wheel of the plurality of wheels in use of powertrain unit;
a first axle coupled to the first drive unit to be rotatably driven by the first drive unit;
a first wheel hub coupled to the first axle and configured to support the first wheel for rotation about a rotational axis;
a second drive unit mounted to the cradle to provide rotational power to a second wheel of the plurality of wheels in use of the powertrain unit;
a second axle coupled to the second drive unit to be rotatably driven by the second drive unit; and
a second wheel hub coupled to the second axle and configured to support the second wheel for rotation about the rotational axis,
wherein the first drive unit, the first axle, the first wheel hub, the second drive unit, the second axle, and the second wheel hub are aligned along, and positioned on, the rotational axis,
wherein the cradle includes an open tray extending continuously from a first end adjacent the first wheel hub to a second end adjacent the second wheel hub,
wherein the first drive unit and the second drive unit are directly affixed to the open tray such that the first drive unit and the second drive unit extend outwardly beneath the open tray and are not completely enclosed by the open tray when the cradle is attached to the underside of the frame structure,
wherein the first drive unit is coupled to the first wheel of the plurality of wheels without any transmission gearing interposed therebetween,
wherein the second drive unit is coupled to the second wheel of the plurality of wheels without any transmission gearing interposed therebetween;
wherein the first axle is arranged entirely outside of the open tray of the cradle; and
wherein the second axle is arranged entirely outside of the open tray of the cradle.

14. The powertrain unit of claim 13, wherein the first drive unit, the first axle, the first wheel hub, the second drive unit, the second axle, and the second wheel hub are mounted to the cradle such that the first drive unit, the first axle, the first wheel hub, the second drive unit, the second axle, and the second wheel hub are detached from the frame structure upon removal of the cradle from the underside of the frame structure.

15. The powertrain unit of claim 13, wherein each of the first drive unit and the second drive unit is an electric motor.

16. The powertrain unit of claim 13, wherein the powertrain unit does not include an internal combustion engine.

17. The powertrain unit of claim 13, wherein the first drive unit is positioned closer to the first wheel than the second wheel, and wherein the second drive unit is positioned closer to the second wheel than the first wheel.

18. A method of using a land vehicle that includes a frame structure supporting a plurality of wheels to permit movement of the vehicle relative to an underlying surface in use of the land vehicle and a powertrain unit coupled to the frame structure, the method comprising:
assembling the powertrain unit;
attaching a cradle of the assembled powertrain unit directly to an underside of the frame structure such that the powertrain unit is disposed in confronting relation with the underlying surface; and
operating the land vehicle, wherein operating the land vehicle comprises:
driving rotation, by a first drive unit that is mounted on a first side of the frame structure, of a first wheel arranged on the first side of the frame structure and positioned closer to the first drive unit than a second drive unit, wherein driving rotation of the first wheel by the first drive unit comprises driving rotation of the first wheel without transmitting rotational power to any transmission gearing; and
driving rotation, by the second drive unit that is mounted on a second side of the frame structure arranged opposite the first side, of a second wheel arranged on the second side of the frame structure and positioned closer to the second drive unit than the first drive unit, wherein driving rotation of the second wheel by the second drive unit comprises driving rotation of the second wheel without transmitting rotational power to any transmission gearing,
wherein assembling the powertrain unit comprises mounting the first drive unit to the cradle such that the first drive unit extends outwardly beneath an open tray of the cradle and is not completely enclosed by the open tray and coupling a first axle of the powertrain unit to the first drive unit such that the first axle is arranged entirely outside of the open tray.

19. The method of claim 18, wherein assembling the powertrain unit comprises:
mounting the second drive unit to the cradle;
coupling a second axle of the powertrain unit to the second drive unit;
coupling a first wheel hub of the powertrain unit to the first axle; and
coupling a second wheel hub of the powertrain unit to the second axle.

20. The method of claim 19, further comprising removing the powertrain unit from the land vehicle, wherein removing the powertrain unit from the land vehicle includes detaching the cradle from the underside of the frame structure.

* * * * *